(12) United States Patent
Obrecht et al.

(10) Patent No.: US 6,372,857 B1
(45) Date of Patent: Apr. 16, 2002

(54) MICROGEL-CONTAINING RUBBER MIXTURES WITH MASKED BI-FUNCTIONAL MERCAPTANS AND VULCANIZATION PRODUCTS PRODUCED THEREFROM

(75) Inventors: Werner Obrecht, Moers; Winfried Jeske, Burscheid, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 46 days.

(21) Appl. No.: 09/653,013

(22) Filed: Sep. 1, 2000

(30) Foreign Application Priority Data

Sep. 7, 1999 (DE) .......................................... 199 42 620

(51) Int. Cl.⁷ .............................................. C08C 19/20
(52) U.S. Cl. ..................................... 525/332.6; 525/350
(58) Field of Search ............................... 525/332.6, 350

(56) References Cited

U.S. PATENT DOCUMENTS

| 2,187,146 A | | 1/1940 | Calcott et al. ................. 18/57 |
|---|---|---|---|
| 4,835,310 A | * | 5/1989 | Wirth ......................... 252/47.5 |
| 5,124,408 A | | 6/1992 | Engels et al. ................ 405/215 |
| 5,395,891 A | | 3/1995 | Obrecht et al. .............. 432/194 |
| 5,612,113 A | | 3/1997 | Irwin, Sr. ..................... 428/95 |
| 5,717,038 A | | 2/1998 | Hörpel et al. ............. 432/332.4 |
| 6,326,518 B1 | * | 12/2001 | Duvall ......................... 568/46 |

FOREIGN PATENT DOCUMENTS

| EP | 432405 | 4/1995 |
|---|---|---|
| GB | 1078400 | 8/1967 |

* cited by examiner

Primary Examiner—Paul R. Michl
(74) Attorney, Agent, or Firm—Joseph C. Gil; Noland J. Cheung

(57) ABSTRACT

The invention relates to rubber mixtures of at least one rubber containing double bonds, at least one rubber gel and at least one masked bismercaptan, and to vulcanization products and rubber shaped articles produced therefrom.

The vulcanization products produced from the rubber mixtures according to the present invention show an improvement in the modulus level, a reduction in the DIN abrasion and a reduction in the heat build-up under dynamic stress.

6 Claims, No Drawings

MICROGEL-CONTAINING RUBBER MIXTURES WITH MASKED BI-FUNCTIONAL MERCAPTANS AND VULCANIZATION PRODUCTS PRODUCED THEREFROM

FIELD OF THE INVENTION

The invention relates to rubber mixtures based on microgel-containing rubbers and masked bifunctional mercaptans and to vulcanization products produced therefrom. By the addition of the masked bifunctional mercaptans to microgel-containing rubber mixtures, an improvement in the modulus level, a reduction in the DIN abrasion after over-vulcanization and a reduction in the heat build-up under dynamic stress (measured with a Goodrich flexometer) in the vulcanization products are achieved.

BACKGROUND OF THE INVENTION

The use of microgels is described in the following patent applications and patents:

EP 405,216, DE 4,220,563, GB 1,078,400, EP 432,405 and EP 432,417. The patents and Applications EP 405,216, DE 4,220,563 and GB 1,078,400 describe the use of CR, BR and NR microgels in mixtures with rubbers containing double bonds. The reinforcing effect of the microgels (modulus) is not sufficient for technical use. This manifests itself, in particular, in that high amounts of gel have to be employed to establish technically relevant modulus ranges. Over-filling of the mixtures occurs due to these high amounts of gel, as a result of which the tear strengths of the vulcanization products decrease. There was, therefore, the technical necessity of discovering measures to increase the modulus of gel-containing rubber vulcanization products of low filler content. There was also the technical necessity of reducing the DIN abrasion after over-vulcanization and of reducing the heating up under dynamic stress (heat build-up).

The use of bismercaptans in rubber compounds is described in EP 432,405 and in EP 432,417. The doctrine in these patent publications is the use of 1,2-bis(N,N-diethylthiocarbamoyldisulfido)-ethane in the preparation of rubber compounds and the resulting advantageous properties of vulcanization products with dithioethanediyl bridges for tire side walls and for tire treads. The use of masked bifunctional mercaptans for increasing the modulus of gel-containing rubber vulcanization products of low filler content is not described and not contained as the doctrine.

SUMMARY OF THE INVENTION

It has now been found that by using masked bifunctional mercaptans a surprisingly high reinforcing effect of microgel-containing vulcanization products is achieved and, as a result, a reduction in the degree of filling with gels becomes possible. A reduction in the DIN abrasion, especially under vulcanization conditions which cause an over-vulcanization, and a reduction in the heat build-up under dynamic stress is also achieved.

DETAILED DESCRIPTION OF THE INVENTION

The present invention, therefore, provides rubber mixtures of at least one rubber (A) containing double bonds, at least one rubber gel (B) and at least one masked bismercaptan (C), wherein the content of rubber (A) containing double bonds is 100 parts by wt., the content of rubber gel (B) is 5 to 150 parts by wt., preferably 20 to 100 parts by wt., and the content of masked bifunctional mercaptan (C) is 0.1 to 10 parts by wt., preferably 0.5 to 7 parts by wt., and optionally fillers and rubber auxiliaries.

Rubber containing double bonds is understood as meaning the rubbers called R rubbers according to DIN/ISO 1629. These rubbers have a double bond in the main chain. They include, e.g.:

NR: natural rubber
SBR: styrene/butadiene rubber
BR: polybutadiene rubber
NBR: nitrile rubber
IIR: butyl rubber
HNBR: hydrogenated nitrile rubber
SNBR: styrene/butadiene/acrylonitrile rubber
CR: polychloroprene However, rubbers containing double bonds are also to be understood as meaning rubbers which are M rubbers according to DIN/ISO 1629 and, in addition to the saturated main chain, contain double bonds in side chains. These include, e.g., EPDM.

Rubber gel (B) is understood as meaning rubber particles (microgels) which are obtained by crosslinking the following rubbers:

BR: polybutadiene,
ABR: butadiene/acrylic acid $C_{1-4}$ alkyl ester copolymers,
IR: polyisoprene,
SBR: styrene/butadiene copolymers with styrene contents of 1–60, preferably 2 to 50 percent by weight,
X-SBR: carboxylated styrene/butadiene copolymers,
FKM: fluorinated rubber,
ACM: acrylate rubber,
NR: natural rubber,
NBR: polybutadiene/acrylonitrile copolymers with acrylonitrile contents of 5 to 60, preferably 10 to 50 percent by weight,
X-NBR: carboxylated nitrile rubbers,
CR: polychloroprene,
IIR: isobutylene/isoprene copolymers with isoprene contents of 0.5 to 10 percent by weight,
BIIR: brominated isobutylene/isoprene copolymers with bromine contents of 0.1 to 10 percent by weight,
CIIR: chlorinated isobutylene/isoprene copolymers with bromine contents of 0.1 to 10 percent by weight,
HNBR: partly and completely hydrogenated nitrile rubbers,
EPDM: ethylene/propylene/diene copolymers,
EAM: ethylene/acrylate copolymers,
EVM: ethylene/vinyl acetate copolymers,
ECO: epichlorohydrin rubber,
Q: silicone rubbers,
AU: polyester-urethane polymers,
EU: polyether-urethane polymers,
ENR: epoxidized natural rubber or mixtures thereof.

Crosslinking of rubbers containing double bonds is preferred, in particular: CR, NR, NBR, BR and SBR.

The microgels have particle diameters of 5 to 1,000 nm, preferably 20 to 600 nm (DVN value according to DIN 53206). Because of their crosslinking, they are insoluble and are swellable in suitable swelling agents, such as, e.g., toluene. The swelling indices of the microgels ($Q_i$) in toluene are 1 to 15, preferably 1 to 10. The swelling index is calculated from the weight of the solvent-containing gel (after centrifugation at 20,000 rpm) and the weight of the dry gel:

$Q_i$=wet weight of the gel/dry weight of the gel.

To determine the swelling index, 250 mg gel are allowed to swell in 25 ml toluene for 24 h, while shaking. The gel is centrifuged off and weighed and is then dried to constant weight at 70° C. and weighed again.

The non-crosslinked rubber starting products can be prepared by emulsion polymerization and solution polymerization.

Naturally occurring latices, such as natural rubber latex, can also be employed.

The following monomers which can be polymerized by free radicals are employed in the preparation of microgels by emulsion polymerization: butadiene, styrene, acrylonitrile, isoprene, esters of acrylic and methacrylic acid, tetrafluoroethylene, vinylidene fluoride, hexafluoropropene, 2-chlorobutadiene, 2,3-dichlorobutadiene and carboxylic acids containing double bonds, such as acrylic acid, methacrylic acid, maleic acid and itaconic acid, hydroxy compounds containing double bonds, such as hydroxyethyl methacrylate, hydroxyethyl acrylate and hydroxybutyl methacrylate, or epoxides containing double bonds, such as glycidyl methacrylate or glycidyl acrylate. The crosslinking of the rubber gel can be achieved directly during the emulsion polymerization by copolymerization with multifunctional compounds having a crosslinking action. Preferred multifunctional comonomers are compounds with at least two, preferably 2 to 4 copolymerizable C═C double bonds, such as diisopropenylbenzene, divinylbenzene, divinyl ether, divinyl sulfone, diallyl phthalate, triallyl cyanurate, triallyl isocyanurate, 1,2-polybutadiene, N,N'-m-phenylenemaleimide, 2,4-toluylenebis-(maleimide) and/or triallyl trimellitate. Compounds, which are moreover possible, are the acrylates and methacrylates of polyhydric, preferably 2- to 4-hydric $C_2$ to $C_{10}$ alcohols, such as ethylene glycol, propanediol-1,2, butanediol, hexanediol, polyethylene glycol with 2 to 20, preferably 2 to 8 oxyethylene units, neopentylglycol, bisphenol A, glycerol, trimethylolpropane, pentaerythritol, sorbitol with unsaturated polyesters from aliphatic di- and polyols and maleic acid, fumaric acid and/or itaconic acid.

The crosslinking to rubber gels during the emulsion polymerization can also take place by continuing the polymerization up to high conversions, or in the monomer feed process by polymerization at high internal conversions. Another possibility is also that of carrying out the emulsion polymerization in the absence of regulators.

For crosslinking of non-crosslinked or weakly crosslinked polymers after the emulsion polymerization, the latices which are obtained during the emulsion polymerization are best employed. In principle, this method can also be applied to non-aqueous polymer dispersions which are accessible in another manner, such as, e.g., by recrystallization. Natural rubber latices can also be crosslinked in this manner.

Chemicals which have a suitably crosslinking action are, for example, organic peroxides, such as dicumyl peroxide, t-butylcumyl peroxide, bis-(t-butyl-peroxyisopropyl) benzene, di-t-butyl peroxide, 2,5-dimethylhexane 2,5-dihydroperoxide, 2,5-dimethyl-3-hexine 2,5-dihydroperoxide, dibenzoyl peroxide, bis-(2,4-dichlorobenzoyl) peroxide and t-butyl perbenzoate, and organic azo compounds, such as azobis-isobutyronitrile and azo-bis-cyclohexanenitrile, as well as di- and polymercapto compounds, such as dimercaptoethane, 1,6-dimercaptohexane, 1,3,5-trimercaptotriazine and mercapto-terminated polysulfide rubbers, such as mercapto-terminated reaction products of bis-chloroethyl formal with sodium polysulfide. The optimum temperature for carrying out the after-crosslinking depends, of course, on the reactivity of the crosslinking agent and the after-crosslinking can be carried out at temperatures from room temperature up to approx. 180° C., optionally under increased pressure (in this context, see Houben-Weyl, Methoden der organischen Chemie, 4th edition, Volume 14/2, page 848). Peroxides are particularly preferred crosslinking agents.

Crosslinking of rubbers containing C═C double bonds to give microgels can also be carried out in dispersion or emulsion with simultaneous partial or complete hydrogenation of the C═C double bond by hydrazine, as described in U.S. Pat. No. 5,302,696 or U.S. Pat. No. 5,442,009, or optionally with other hydrogenating agents, for example, organometallic hydride complexes.

Rubbers, which are prepared by solution polymerization, can also be used as starting products for the preparation of the microgels. In these cases, solutions of these rubbers in suitable organic solutions are the starting products. The desired sizes of the microgels are established by mixing the rubber solution in a liquid medium, preferably, in water, optionally with the addition of suitable surface-active auxiliaries, such as surfactants, by means of suitable units, so that a dispersion of the rubber in the suitable particle size range is obtained. For crosslinking the dispersed solution rubbers, the procedure is as described previously for the subsequent crosslinking of emulsion polymers. Suitable crosslinking agents are the above-mentioned compounds, it being possible for the solvent employed for the preparation of the dispersion optionally to be removed, e.g. by distillation, before the cross-linking.

The masked bismercaptans (C) are derived from the corresponding non-masked bismercaptans of the following general formula:

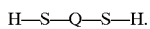

The bismercaptans can be employed in the pure form, although the susceptibility of corresponding mixtures to scorching is too high. Mixtures which are less susceptible to scorching are obtained by employing the mercaptans in masked form. The masked bismercaptans have the following general structural formula:

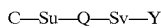

wherein Q denotes a spacer group and wherein the hydrogen atoms of the non-masked mercaptans are replaced by substituents X and Y in a suitable manner.

Spacer groups Q which are of particular interest are those with structural elements based on aliphatic, heteroaliphatic, aromatic and heteroaromatic hydrocarbon chains (with 1 to 3 heteroatoms, such as O, S and N), the number of carbons in the chain being 1 to 20, preferably 1 to 12.

Su and Sv in the formula, are sulfur bridges, u and v denoting numbers from 1 to 6 and u=v=2 being preferred.

Substituents X and Y which are preferably to be mentioned are:

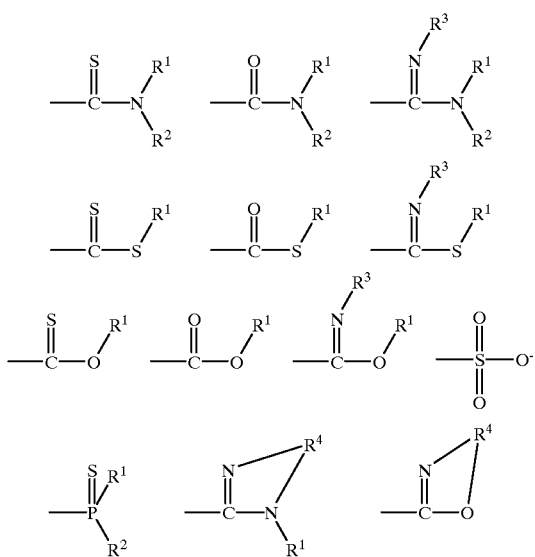

wherein $R^1$ to $R^3$ represent $C_1$- to $C_{20}$-alkyl, aralkyl or aryl radicals and $R^4$ has the meaning of Q.

The following masked bismercaptans are of interest:

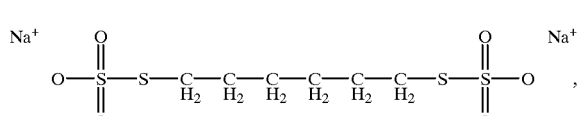

(I)

and

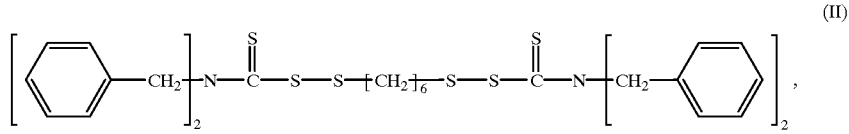

(II)

and
compound (II) being of particular interest. Compound (II), 1,6-bis-(N,N'-dibenzylthiocarbamoyldithio)-hexane, is commercially obtainable under the name Vulcuren®, VP KA 9188 (Bayer AG).

The rubber mixtures according to the present invention of rubber (A) containing double bonds, rubber gel (B) and masked bismercaptan (C) can comprise additional further components, such as fillers.

Particularly suitable fillers for the preparation of the rubber mixtures and vulcanization products according to the present invention are:

carbon blacks. The carbon blacks to be used here are prepared by the flame black, furnace or gas black process and have BET surface areas of 20 to 200 m²/g, such as, e.g.: SAF, ISAF, IISAF, HAF, FEF or GPF carbon blacks.

high disperse silica prepared, e.g., by precipitation of solutions of silicates or flame hydrolysis of silicon halides and with specific surface areas of 5 to 1,000, preferably 20 to 400 m²/g (BET surface area) and primary particle sizes of 5 to 400 nm. The silicas can optionally also be in the form of mixed oxides with other metal oxides, such as oxides of Al, Mg, Ca, Ba, Zn and Ti.

synthetic silicates, such as aluminum silicate and alkaline earth metal silicates, such as magnesium silicate or calcium silicate, with BET surface areas of 20 to 400 m²/g and primary particle diameters of 5 to 400 nm.

synthetic silicates, such as aluminum silicate and alkaline earth metal silicates, such as magnesium silicate or calcium silicate, with BET surface areas of 20 to 400 m²/g and primary particle diameters of 5 to 400 nm.

natural silicates, such as kaolin and other naturally occurring silicas.

metal oxides, such as zinc oxide, calcium oxide, magnesium oxide and aluminium oxide.

metal carbonates, such as calcium carbonate, magnesium carbonate and zinc carbonate.

metal sulfates, such as calcium sulfate and barium sulfate.

metal hydroxides, such as aluminium hydroxide and magnesium hydroxide.

glass fibers and glass fiber products (mats, strands or glass microbeads).

thermoplastic fibers (polyamide, polyester and aramid).

rubber gels based on polychloroprene and/or polybutadiene or also all other gel particles described above which have a high degree of crosslinking and a particle size of 5 to 1,000 nm.

The fillers mentioned can be employed by themselves or as a mixture. In a particularly preferred embodiment of the process 10 to 100 parts by weight of rubber gel (B), optionally together with 0.1 to 100 parts by weight of carbon black and/or 0.1 to 100 parts by weight of light-colored fillers, in each case per 100 parts by weight of non-crosslinked rubber, are employed.

The rubber mixtures according to the present invention can comprise further rubber auxiliaries, such as, e.g., crosslinking agents, reaction accelerators, anti-aging agents, heat stabilizers, light stabilizers, ozone stabilizers, processing auxiliaries, plasticizers, tackifiers, blowing agents, dyestuffs, pigments, waxes, extenders, organic acids, retardants, metal oxides and filler activators, such as, for example, triethanolamine, polyethylene glycol, hexanetriol, bis-(triethoxysilylpropyl) tetrasulfide or others known to the rubber industry.

The rubber auxiliaries are employed in the conventional amounts, which depend, inter alia, on the intended use. Conventional amounts are, e.g., amounts of 0.1 to 50 percent by weight, based on the amounts of rubber (A) employed.

Conventional crosslinking agents which can be used are sulfur, sulfur donors, peroxides or crosslinking agents, such as, for example, diisopropenylbenzene, divinylbenzene, divinyl ether, divinyl sulfone, diallyl phthalate, triallyl cyanurate, triallyl isocyanurate, 1,2-polybuta-diene, N,N'-m-phenylenemaleimide and/or triallyl trimellitate. Compounds which are moreover possible are the acrylates and methacrylates of polyhydric, preferably 2- to 4-hydric $C_2$ to $C_{10}$ alcohols, such as ethylene glycol, propanediol-1,2-butanediol, hexanediol, polyethylene glycol with 2 to 20, preferably 2 to 8 oxyethylene units, neopentylglycol, bisphenol A, glycerol, trimethylol-propane, pentaerythritol, sorbitol with unsaturated polyesters from aliphatic di- and polyols and maleic acid, fumaric acid and/or itaconic acid.

The rubber mixtures according to the present invention can moreover comprise vulcanization accelerators. Examples of suitable vulcanization accelerators are, e.g., mercaptobenzothiazoles and -sulfenamides, guanidines, thiurams, dithiocarbamates, thioureas, thiocarbonates and dithiophosphates. The vulcanization accelerators, sulfur and sulfur donors or peroxides or further crosslinking agents, such as, for example, dimeric 2,4-toluylidene-diisocyanate (=Desmodur TT) or 1,4-bis-1-ethoxyhydroquinone (=Crosslinking Agent 30/10) are employed in amounts of 0.1–40 per cent by weight, preferably 0.1 to 10 percent by weight, based on the total amount of rubber.

The vulcanization of the rubber mixtures according to the present invention can be carried out at temperatures of 100 to 250° C., preferably 130 to 180° C., optionally under a pressure of 10 to 200 bar.

The rubber mixtures according to the present invention of rubber (A), rubber gel (B) and masked bismercaptan (C) can be prepared in various ways:

It is, of course, possible to mix the solid individual components. Units which are suitable for this are, for example, mills, internal mixers or also mixing extruders. However, mixing by combining the latices of the non-crosslinked or also of the crosslinked rubbers is also possible. The mixture according to the present invention thus prepared can be isolated in the conventional manner, by evaporation, precipitation or freeze-coagulation (cf., U.S. Pat. No. 2,187,146). The mixtures according to the present invention can be obtained directly as a rubber/filler formulation by mixing fillers into the latex mixture and subsequently working up the mixture. Further mixing of the rubber mixture of rubber (A) containing double bonds, rubber gel (B) and masked bismercaptan (C) with additional fillers and optionally rubber auxiliaries can be carried out in conventional mixing units, mills, internal mixers or also mixing extruders. Preferred mixing temperatures are 50 to 180° C.

The rubber vulcanization products which can be produced according to the present invention are suitable for the production of shaped articles, e.g., for the production of cable sheathings, hoses, drive belts, conveyor belts, roller coverings, tire components, in particular tire treads, shoe soles, sealing rings and insulating elements, as well as membranes.

The invention is further illustrated but is not intended to be limited by the following examples in which all parts and percent ages are by weight unless otherwise specified.

EXAMPLES

Example 1
Preparation of the SBR gel/NR Masterbatch

To prepare the SBR gel/NR masterbatch, the latex containing SBR microgel is first prepared separately; this is mixed with the NR latex and the mixture of the two latices is coagulated.

The SBR gel is prepared starting from Baystal 1357 from Polymer Latex GmbH (formerly: Bayer France, Port Jérôme) by crosslinking with dicumyl peroxide. Baystal 1357 is a non-carboxylated SBR latex with a styrene content of 22 wt. % and a solids content of 38 wt. %. The gel content is 75 wt. % and the swelling index of the gelled content is 61 (wet weight/dry weight in toluene). The latex particles have a diameter of $d_{10}$=50 nm, $d_{50}$=56 nm and $d_{80}$=60 nm. The density of the latex particles is 0.9281 g/cm$^3$. The glass transition temperature of the SBR is −57° C.

Example 2
Crosslinking of the SBR Rubber in Latex Form

For crosslinking with dicumyl peroxide (DCP), the latex is diluted to a solids concentration of 30 wt. % and introduced into an autoclave. DCP is added in solid form at room temperature (1.5 phr based on the solid product). The DCP is melted by heating up the latex to 60° C. and is distributed thoroughly in the latex by stirring. To remove oxygen, the contents of the reactor are evacuated at 60° C., while stirring, and nitrogen is forced in. The evacuation/$N_2$ gassing cycle is repeated 3 times. Thereafter, the reactor is heated up to 150° C. To avoid caking of the latex during heating up, it is ensured that the difference between the jacket and internal temperature does not exceed 10° C. After the heating up, the internal temperature is kept at not less than 150° C. for 45 min. Thereafter, the latex is cooled and filtered over a Monodur cloth.

The particle size of the latex is practically unaffected by the after-crosslinking with DCP; the gel content rises to 97.5% and the density to 0.9717 g/cm$^3$; the swelling index decreases to 5.4% and the glass transition temperature rises to −26.5° C.

Example 3
Working up of the SBR Microgel as an NR Masterbatch

To ensure good distribution of the microgels in the latex rubber matrix, the microgel latex is worked up as an NR masterbatch, an NR/microgel weight ratio of 50/50 being established.

Taytex with a solids concentration of 61 wt. % (importer: Theodor Durrieu, Hamburg) is used as the NR masterbatch component.

Before the two latices are mixed, 5 wt. %, based on the NR, of 5% Dresinate 731 solution (sodium salt of disproportionated abietic acid from Hercules) is added to the NR latex. Thereafter, the NR latex and the carboxylated gel latex are mixed at room temperature for 10 min with intensive stirring.

After preparation of the latex mixture, an anti-aging agent dispersion is added. A 10% aqueous dispersion of an aminic anti-aging agent is used for this. The following is used for stabilization of 1 kg of solid product: 50 g of a dispersion of Vulkanox 4020 (N-isopropyl-N'-phenyl-p-phenylenediamine/Bayer AG), 0.0913 g NaOH and 0.45 g Emulsifier T 11 (partly hydrogenated tallow fatty acid/Procter & Gamble) and 0.193 g Oulu GP 331 (non-modified resin acid/Veitsiluto, Oulu).

For the coagulation, the stabilized latex mixture is stirred into an electrolyte solution at room temperature, the following solution being initially introduced for coagulation of 1 kg of solid product:

Electrolyte solution of 111 water; 150 g sodium chloride; 47 g Al sulfate; 18 water of crystallization; 100 g Superfloc (1%).

The rubber crumbs are washed a total of three times until free from chloride by being filtered off, suspended in approx. 151 Lewatit water and heated at 95° C., while stirring. The rubber crumbs are then dried to constant weight at 70° C. in a vacuum drying cabinet (approx. 60 h).

Example 4

Compound Preparation, Vulcanization and Results

The following series of mixtures are prepared on the basis of the abovementioned NR masterbatch of the SBR gel and the properties of the corresponding vulcanization products are determined.

Mixture Series A

Compound with 75 phr SBR gel. It is found that by additions of 1,6-bis(N,N'-dibenzylthiocarbamoyldithio)-hexane, the modulus level of the gel-containing compounds is increased significantly.

Mixture Series B

It is found that in a compound with 60 phr SBR gel, a further increase in the modulus level is possible by combination of 1,6-bis(N,N'-dibenzylthiocarbamoyldithio)-hexane with bis(triethoxy-propyl-silyl-disulfane).

A significant reduction in the DIN abrasion is achieved by a considerable lengthening of the vulcanization time (160° C./2 h).

Mixture Series C

It is found that by additions of 1,6-bis(N,N'-dibenzylthio-carbamoyldithio)-hexane and of bis(triethoxy-propyl-silyl-disulfane) $M_{300}$ values of >10 Mpa are achieved even at gel contents of 50 and of 40 phr, and that these additions have a positive influence, in particular, on the heat build-up in the Goodrich Flexometer test.

Various compounds (amounts stated in phr) based on the SBR/NR masterbatch are prepared in a laboratory internal mixer in accordance with the following recipe.

The components of the mixture are mixed in the sequence shown in the table:

TABLE 1

Mixture series A

| Mixture no.: | 1 | 2 | 3 | 4 | 5 |
|---|---|---|---|---|---|
| Natural rubber, premasticated* | 25 | 25 | 25 | 25 | 25 |
| NR masterbatch with 50 wt. % SBR microgel | 150 | 150 | 150 | 150 | 150 |
| Ozone stabilizing wax** | 1 | 1 | 1 | 1 | 1 |
| Stearic acid | 3 | 3 | 3 | 3 | 3 |
| Zinc oxide | 3 | 3 | 3 | 3 | 3 |
| IPPD*** | 1 | 1 | 1 | 1 | 1 |
| TMQ**** | 1 | 1 | 1 | 1 | 1 |
| Sulfur | 1.6 | 1.6 | 1.6 | 1.6 | 1 |
| TBBS***** | 1 | 2 | 1 | 1 | 1 |
| Crosslinking Agent II****** | 0 | 0 | 1 | 2 | 2 |

*TSR 5, Defo 700
**Antilux ® 654 from Rheinchemie Rheinau GmbH
***Vulkanox ® 4010 NA from Bayer AG
****Vulkanox ® HS from Bayer AG
*****Vulkacit ® NZ from Bayer AG
******Test product KA 9188 from Bayer AG (Vulcuren ®)

The vulcanization rates of the mixtures are investigated in a rheometer experiment at 160° C. Characteristic heating times, such as, e.g. $t_{95}$, are determined in this manner. $t_{95+5}$ is chosen as the vulcanization time for the production of the vulcanization products:

TABLE 2

| Mixture number | 1 | 2 | 3 | 4 | 5 |
|---|---|---|---|---|---|
| Vulcanization time [min] | 14.6 | 15.2 | 15.4 | 15.7 | 15.8 |

The following test results are obtained on the basis of the abovementioned compounds:

TABLE 3

| Mixture no.: | 1 | 2 | 3 | 4 | 5 |
|---|---|---|---|---|---|
| Tensile strength [MPa] | 21.3 | 24 | 21 | 16 | 18 |
| Elongation at break [%] | 540 | 568 | 413 | 328 | 335 |
| Modulus at 100% elongation [MPa] | 1.6 | 1.6 | 2.2 | 2.7 | 2.6 |
| Modulus at 300% elongation [MPa] | 7.2 | 7.4 | 11.4 | 14.8 | 14.7 |
| Shore A hardness, 23° C. | 58 | 59 | 64 | 66 | 66 |
| Shore A hardness, 70° C. | 50 | 53 | 58 | 60 | 60 |
| Rebound resilience, 23° C. [%] | 37 | 38 | 38 | 39 | 39 |
| Rebound resilience, 70° C. [%] | 59 | 61 | 65 | 67 | 66 |
| Abrasion 40 grade emery [mm$^3$] | 196 | 244 | 270 | 322 | 273 |
| Abrasion 60 grade emery [mm$^3$] | 132 | 137 | 212 | 148 | 149 |

TABLE 4

Mixture series B

| Mixture no.: | 6 | 7 | 8 |
|---|---|---|---|
| TSR 5, Defo 700 | 40 | 40 | 40 |
| NR masterbatch with 50 wt. % SBR microgel | 120 | 120 | 120 |
| Antilux ® 654 | 1.5 | 1.5 | 1.5 |
| Stearic acid | 3.0 | 3.0 | 3.0 |
| Zinc oxide | 3.0 | 3.0 | 3.0 |
| Vulkanox ® 4010 NA | 1.0 | 1.0 | 1.0 |
| Vulkanox ® HS | 1.0 | 1.0 | 1.0 |
| Si 69 ® | 0 | 0 | 6 |
| Sulfur | 1.6 | 1.6 | 1.6 |
| Vulkacit NZ | 1 | 1 | 1 |
| KA 9188 | 0 | 2 | 2 |

Si 69 ® = Bis(tri-ethoxy-silyl-propyl-disulfane)/Degussa

The vulcanization rates of the mixtures are investigated in a rheometer experiment at 160° C. Characteristic heating times, such as, e.g., $t_{95}$, are determined in this manner. $t_{95+5}$ is chosen as the vulcanization time for the production of the vulcanization products:

TABLE 5

| Mixture no.: | 6 | 7 | 8 |
|---|---|---|---|
| Vulcanization time [min] | 16.5 | 15.6 | 16.0 |

The following test results are obtained on the basis of the abovementioned compounds:

TABLE 6

| Mixture no.: | 1 | 2 | 3 |
|---|---|---|---|
| Tensile strength [MPa] | 25.4 | 21.3 | 14.3 |
| Elongation at break [%] | 627 | 403 | 267 |
| Modulus at 100% elongation [MPa] | 1.5 | 2.5 | 3.6 |
| Modulus at 300% elongation [MPa] | 6.1 | 12.6 | — |
| Shore A hardness, 23° C. | 57.9 | 64.1 | 68 |
| Shore A hardness, 70° C. | 51.4 | 58.5 | 63 |
| Rebound resilience, 23° C. [%] | 40.8 | 41.3 | 48 |
| Rebound resilience, 70° C. [%] | 63 | 68 | 73 |
| Abrasion 40 grade emery [mm3] | 197 | 321 | 324 |
| Abrasion 60 grade emery [mm3] | 121 | 163 | 126 |

After a vulcanization time of 2 hour at 160° C. (over-vulcanization), the following test results are obtained:

TABLE 7

| Mixture no.: | 6 | 7 | 8 |
|---|---|---|---|
| Tensile strength [MPa] | 21.8 | 18.7 | 14.6 |
| Elongation at break [%] | 632 | 400 | 292 |

TABLE 7-continued

| Mixture no.: | 6 | 7 | 8 |
|---|---|---|---|
| Modulus at 100% elongation [MPa] | 1.6 | 2.3 | 3.2 |
| Modulus at 300% elongation [MPa] | 5.4 | 10.7 | — |
| Shore A hardness, 23° C. | 57 | 62.5 | 64.2 |
| Shore A hardness, 70° C. | 50 | 57.8 | 61.7 |
| Rebound resilience, 23° C. [%] | 37 | 42 | 49.3 |
| Rebound resilience, 70° C. [%] | 50 | 68 | 71 |
| Abrasion 40 grade emery [mm³] | 167 | 190 | 148 |
| Abrasion 60 grade emery [mm³] | 136 | 95 | 65 |

TABLE 8

Mixture series C

| Mixture no.: | 9 | 10 | 11 | 12 |
|---|---|---|---|---|
| TSR 5, Defo 700 | 50 | 50 | 60 | 60 |
| NR masterbatch with 50 wt. % SBR microgel | 100 | 100 | 80 | 80 |
| Antilux ® 654 | 1.5 | 1.5 | 1.5 | 1.5 |
| Stearic acid | 3.0 | 3.0 | 3.0 | 3.0 |
| Zinc oxide | 3.0 | 3.0 | 3.0 | 3.0 |
| Vulkanox ® 4010 NA | 1.0 | 1.0 | 1.0 | 1.0 |
| Vulkanox ® HS | 1.0 | 1.0 | 1.0 | 1.0 |
| Si 69 ® | 0 | 3 | 0 | 0 |
| Sulfur | 1.6 | 1 | 1.6 | 1 |
| Vulkacit ® NZ | 1 | 1 | 1 | 1 |
| KA 9188 | 0 | 2 | 0 | 2 |

The vulcanization rates of the mixtures are investigated in a rheometer experiment at 160° C. Characteristic heating times, such as, e.g., $t_{95}$, are determined in this manner. $t_{95+5}$ is chosen as the vulcanization time for the production of the vulcanization products:

TABLE 9

| Mixture no.: | 9 | 10 | 11 | 12 |
|---|---|---|---|---|
| Vulcanization time [min] | 15.2 | 19.8 | 19.6 | 20.2 |

The following test results are obtained on the basis of the abovementioned compounds:

TABLE 10

| Mixture no.: | 9 | 10 | 11 | 12 |
|---|---|---|---|---|
| Tensile strength [MPa] | 27.9 | 19.7 | 28 | 25.2 |
| Elongation at break [%] | 696 | 366 | 693 | 426 |
| Modulus at 100% elongation [MPa] | 1.4 | 2.9 | 1.3 | 2.6 |
| Modulus at 300% elongation [MPa] | 5.4 | 13.1 | 4.7 | 12.3 |
| Shore A hardness, 23° C. | 55 | 63 | 54 | 62 |
| Shore A hardness, 70° C. | 50 | 49 | 49 | 58 |
| Rebound resilience, 23° C. [%] | 44 | 48 | 49 | 58 |
| Rebound resilience, 70° C. [%] | 64 | 71 | 66 | 74 |
| Abrasion 40 grade emery [mm3] | 171 | 227 | 171 | 220 |
| Abrasion 60 grade emery [mm3] | 122 | 127 | 130 | 141 |

The following values are obtained with the abovementioned vulcanization products in the Goodrich flexometer test:

TABLE 11

| Testing at 100° C./25 min | 9 | 10 | 11 | 12 |
|---|---|---|---|---|
| Temperature at the sample holder after 25 min [° C.] | 108.3 | 105.7 | 107.2 | 104.9 |
| Flow during testing | 0.5 | −0.5 | 0.3 | 0 |
| Residual deformation after testing [%] | 2.4 | 0.8 | 1.6 | 0.8 |
| Internal temperature of the test specimen after 25 min [° C.] | 120.1 | 114.1 | 115.7 | 111.9 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber mixtures comprising at least one rubber (A) containing double bonds, at least one rubber; gel (B) and at least one masked bismercaptan (C), wherein the content of rubber (A) containing double bonds is 100 parts by wt., the content of rubber gel (B) is 5 to 150 parts by wt., and the content of masked bifunctional mercaptan (C) is 0.1–10 parts by wt., and optionally fillers and rubber auxiliaries.

2. Rubber mixtures according to claim 1, wherein said rubber gels (B) are based on rubbers containing double bonds.

3. Rubber mixtures according to claim 1, wherein said masked bifunctional mercaptan comprises the formula:

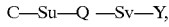

wherein Q denotes a spacer group, u and v are independently 1 to 6, and X and Y are independent of one another are:

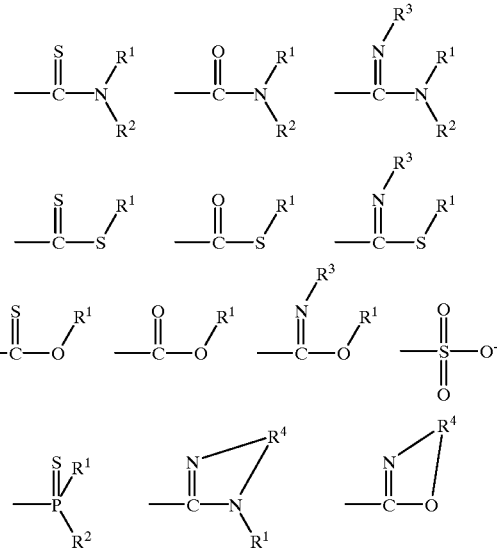

wherein $R^1$ to $R^3$ represent $C_1$- to $C_{20}$-alkyl, aralkyl or aryl radicals and $R^4$ has the meaning of Q.

4. Rubber mixtures according to claim 3, wherein said masked bismercaptan (C) is 1,6-bis(N,N'-dibenzylthiocarbamoyldithio)-hexane.

5. A process for producing rubber articles comprising the vulcanization of rubber mixtures comprising at least one rubber (A) containing double bonds, at least one rubber gel (B) and at least one masked bismercaptan (C), wherein the content of rubber (A) containing double bonds is 100 parts by wt., the content of rubber gel (B) is 5 to 150 parts by wt., and the content of masked bifunctional mercaptan (C) is 0.1 to 10 parts by wt., and optionally fillers and rubber auxiliaries.

6. A process for producing rubber articles according to claim 5, wherein said rubber articles are cable sheathings, hoses, drive belts, conveyor belts, shoe soles, sealing rings, insulating elements and membranes.

* * * * *